United States Patent
Gunaltun

(10) Patent No.: US 6,886,206 B1
(45) Date of Patent: May 3, 2005

(54) SCRAPER FOR INHIBITING CORROSION IN THE ARCH OF A PIPE CARRYING A MULTIPHASE CORROSIVE LIQUID

(75) Inventor: Yves Gunaltun, Marly-le-Roi (FR)

(73) Assignee: Total, Puteaux (FR)

( * ) Notice: Subject to any disclaimer, the term of this patent is extended or adjusted under 35 U.S.C. 154(b) by 0 days.

(21) Appl. No.: 09/959,437

(22) PCT Filed: Mar. 31, 2000

(86) PCT No.: PCT/FR00/00819

§ 371 (c)(1),
(2), (4) Date: May 14, 2002

(87) PCT Pub. No.: WO00/60274

PCT Pub. Date: Oct. 12, 2000

(30) Foreign Application Priority Data

Apr. 2, 1999 (FR) ............................................. 99 04138

(51) Int. Cl.[7] .............................................. B08B 9/055
(52) U.S. Cl. ............................... 15/104.061; 134/167 C
(58) Field of Search ................. 15/104.061; 134/166 C, 134/167 C, 168 C, 169 C

(56) References Cited

U.S. PATENT DOCUMENTS

| | | | | |
|---|---|---|---|---|
| 1,835,119 A | * | 12/1931 | Oberhuber | 15/104.061 |
| 2,567,475 A | * | 9/1951 | Hall | 166/117 |
| 3,600,736 A | * | 8/1971 | Smith et al. | 15/104.061 |
| 3,643,280 A | * | 2/1972 | Powers | 15/104.061 |
| 3,659,305 A | * | 5/1972 | Powers | 15/104.061 |
| 4,786,525 A | | 11/1988 | Kayser et al. | 427/236 |
| 4,891,115 A | * | 1/1990 | Shishkin et al. | 204/212 |
| 5,650,103 A | | 7/1997 | Perkins et al. | 264/35 |
| 5,795,402 A | * | 8/1998 | Hargett et al. | 134/8 |
| 5,875,803 A | * | 3/1999 | Leitko et al. | 134/167 C |
| 6,263,534 B1 | * | 7/2001 | McCann et al. | 15/3.5 |

FOREIGN PATENT DOCUMENTS

| | | |
|---|---|---|
| EP | 0 618 396 B1 | 10/1994 |
| FR | 2 571 821 | 4/1986 |
| GB | 2 218 773 A | 11/1989 |

* cited by examiner

Primary Examiner—Mark Spisich
(74) Attorney, Agent, or Firm—Sughrue Mion, PLLC

(57) ABSTRACT

A method for inhibiting corrosion (18) in the arch of a pipe (10) carrying a multiphase corrosive liquid containing a liquid phase (12) which flows off at the lower part of the pipe (10) and a gaseous phase (14) which flows off at the upper part of the pipe. The method includes the following: a scraper (16) is introduced into the pipe, a joint (27) is provided between the scraper (16) and the inner wall of the pipe in such a way that the scraper is moved along the pipe from top to bottom as a result of the effect of the pressure difference between the top and bottom, a liquid that inhibits corrosion is introduced into the scraper or the liquid is injected into the pipe where it is mixed with the liquid phase (12), the scraper is provided with an uptake and projection device (22) that enable the corrosion-inhibiting liquid contained in the scraper or the mixture contained in the pipe to be taken up, whereby the liquid is projected onto the inner wall of the arch of the pipe as the scraper advances in the pipe.

11 Claims, 2 Drawing Sheets

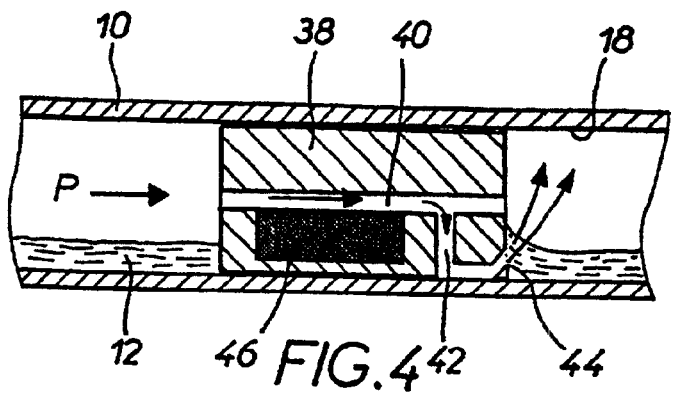
FIG. 4
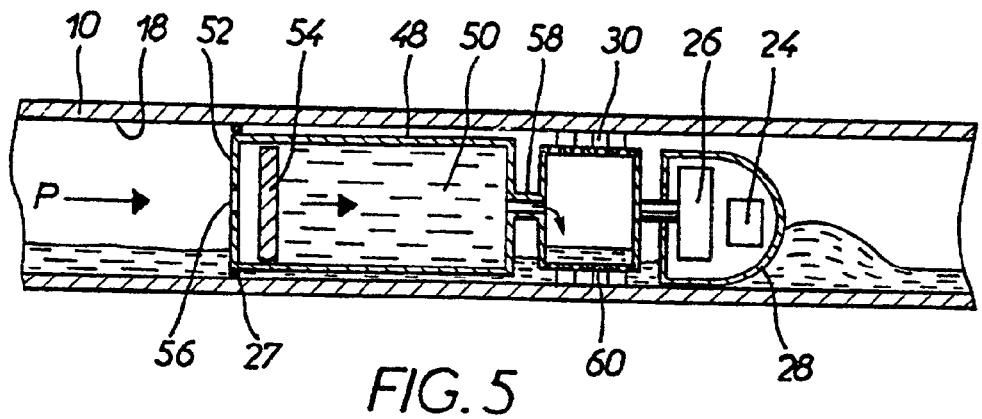
FIG. 5
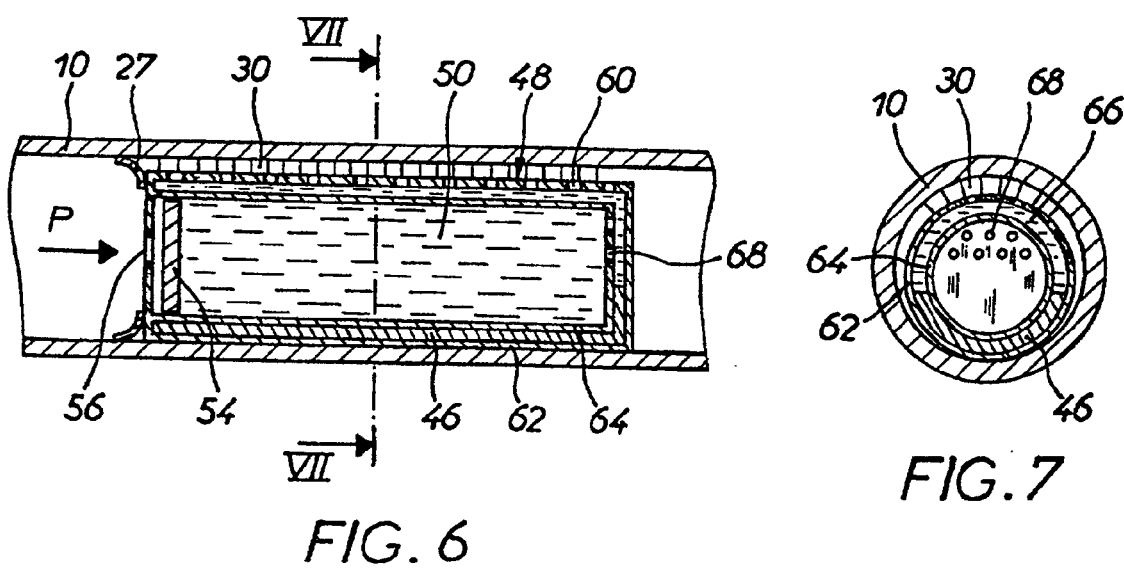
FIG. 6
FIG. 7

SCRAPER FOR INHIBITING CORROSION IN THE ARCH OF A PIPE CARRYING A MULTIPHASE CORROSIVE LIQUID

This invention relates to a method for inhibiting corrosion in the upper part or arch of a pipe carrying a multiphase corrosive liquid, without interrupting the flow of said liquid.

In pipes carrying a multiphase corrosive liquid with a stratified, wavy or wavy-stratified flow regime, the liquid phase flows off at the lower part of the pipe, whereas the gaseous phase flows off at the upper part of the pipe.

The gaseous phase may contain acid gases such as carbon dioxide and sulfurous hydrogen and organic gases, such as acetic acid, and the liquid phase may contain hydrocarbons and a considerable amount of water.

To protect the inner wall of the pipe against corrosion caused by the acids, it is customary to inject a corrosion inhibiting liquid that mixes with the liquid phase into the pipe where it exits the gas extraction shaft. But, when the flow regime is stratified, wavy or wavy-stratified, only the lower part of the pipe that comes in contact with the liquid phase is efficiently protected against corrosion, not the upper part as the inhibitor hardly moistens it.

Yet, today, gas extraction temperatures are higher and higher, so the risks of corrosion of the arch are particularly significant. Under the effect of the heat, the water contained in the liquid phase is transformed into steam that condenses on the inner wall of the arch, which is cooled by the outside air and water (underwater pipes). The condensed moisture, in the presence of acid, has a bold corrosive effect on the arch of the pipe.

Various methods and devices have been proposed in the past to protect the arch against corrosion. One of said methods consists in sending into the pipe two scrapers whose cross sections are slightly smaller than the inner cross section of the pipe and that are spaced at a certain distance from each other along the pipe, where the space between the two scrapers is filled with an inhibiting liquid plug. The set of scrapers moves along the pipe at a speed ranging between 1 and 3 m/s. As said set advances, it covers the inner wall of the pipe, including the arch, with a film of inhibiting liquid. Although the transit time of the set for a given section of the pipe is only of a few seconds, it is sufficient for the film that is deposited to properly adhere thereto, sometimes for up to two weeks.

However, this method, which uses two scrapers, is expensive and difficult to implement.

Through patent GB 2 218 773, we know of a device used to apply a moisture-setting coat, either solid or pasty, on the inner wall of a sewer pipe, usually made of concrete, in order to repair the sections of this wall that have been damaged.

However, this device has not been adapted to the specific application of the invention, which is to protect the arch of a pipe carrying wet gas against corrosion, without having to interrupt the flow of the wet gas. Indeed said patent shows that prior to applying the coating, it is necessary to wait for the sewer pipe to be completely emptied.

Furthermore, this device does not function autonomously, as it is linked through flexible pipes to a feeding device as far as the coating outside the pipe is concerned. Also, it is not autonomous in its movement as is pulled from the outside by a cable. This lack of autonomy is very restrictive as it limits the movement of the device to the length of the cables and pipes. It is not recommended to use long cables and pipes as they would become cumbersome and hard to handle.

We also know through patents FR 2 571 821, U.S. Pat. No. 4,786,525, U.S. Pat. No. 5,650,103 and EP 0 618 396 of devices that are used to treat the inner wall of a pipe, but that all have the same disadvantages as the previous device.

The object of this device is to correct these disadvantages and, with this end in mind, its object is a method for inhibiting corrosion as set forth in claim 1. Variants of this method are the object of claims 2 through 4.

The invention also relates to a scraper for the implementation of said method, as set forth in claim 5. Other characteristics of the scraper as set forth in the invention are the object of claims 6 through 19.

Several methods of execution of the invention will now be described as examples, using the attached schematic drawings where:

FIG. 4 is a sectional view of a scraper that pulverizes a liquid jet toward the arch using a gas leakage flow;

FIG. 5 is an axial sectional view of a scraper that contains a reserve of corrosion inhibiting liquid that is distributed via a piston;

FIG. 6 is an axial sectional view of a scraper carrying a reserve of corrosion inhibiting liquid and equipped with a non revolving brush on its upper wall; and FIG. 7 is a sectional view along line VII—VII from FIG. 6.

Figure 1:
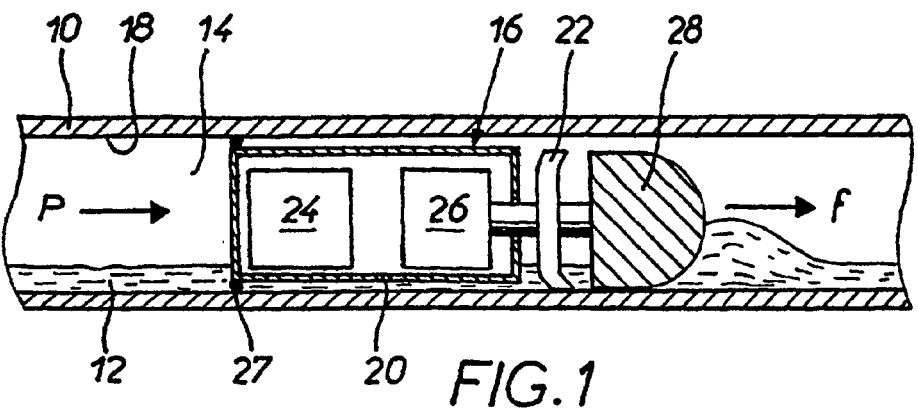
FIG. 1 is an axial sectional view of a pipe carrying a multiphase wet gas in which is mounted a scraper equipped with a revolving small dish and a guide.

FIG. 1 represents a pipe 10, usually made of lead that carries a multiphase wet gas that flows off from top to bottom under pressure P. When the wet gas flows off in a stratified, wavy or wavy-stratified regime, it separates into a low liquid phase 12 that flows off at the lower part of the pipe and a gaseous phase 14 that flows off under pressure at the upper part of the pipe.

The gaseous phase may contain corrosive gases. The liquid phase comprises hydrocarbons, a small amount of water and a corrosion inhibiting liquid that is injected into the pipe at the starting point. The corrosion inhibitor is of the film type with good resistance, meaning it covers the surface on which it is projected with a persistent protection film that resists well against disintegration from high flow speeds and high water condensation speeds.

Inside the pipe, a sliding device or scraper 16 is mounted; it is used to take up a liquid mixture 12 and project it toward the upper wall of the pipe or arch 18 that does not bath in the liquid. Said scraper is mainly comprised of a cylindrical casing 20 which houses a battery 24 and an engine 26 whose shaft projects through the front side of the casing. The diameter of the casing is considerably smaller than the inner diameter of the pipe, a joint 27, for example an O-ring, makes a seal between the walls of the casing with which it is in contact and the pipe. A revolving part 22 is attached to the engine shaft and is used to eject the corrosion inhibiting liquid toward the arch 18. In this case, the revolving part consists of a small dish in the form of a disk. The lower part of the small dish is immersed in the liquid phase 12 and its upper part is close to the arch, so that when it turns, it projects liquid towards the arch.

In the pipe, the tight joint 27 delimits an up side under pressure P and a down side under a lower pressure. The result is that the scraper is pulled in the direction of the arrow f by the difference in pressure between the top and the bottom.

In order to make the rotation movement of the small dish 22 easier and improve the distribution of the liquid on the inner wall of the pipe, the liquid located upstream from the small dish is pushed by a guide 28 which can be given any appropriate shape.

In the method of execution used in FIG. 1, the guide has a semi-spherical shape whose diameter is slightly smaller than the diameter of the pipe and whose concavity faces upstream. The lower part of the guide is more or less tangential to the inner wall of the pipe. The guide can be attached to the engine shaft and is then rotary, but it can also be mounted in a fixed position.

Figure 2:
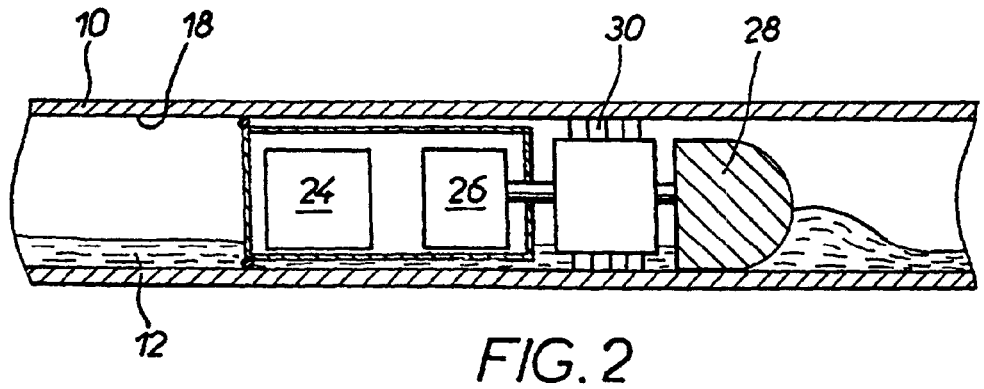
FIG. 2 is an axial sectional view that illustrates a scraper equipped with a revolving brush and a guide.

The method of execution used in FIG. 2 only differs from the previous method in that the small dish is replaced by a rotating brush 30. As it turns, the brush coats the arch 18 with the liquid it takes up from the lower part of the pipe.

Figure 3:
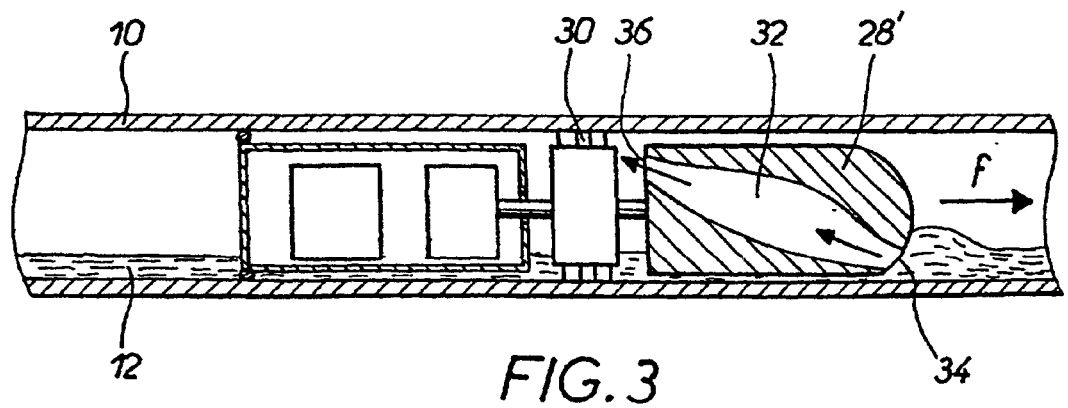
FIG. 3 represents an axial sectional view of a scraper equipped with a hollow guide that makes it possible to recuperate liquid from the front and project it onto the brush.

FIG. 3 shows a scraper that is identical to that of FIG. 2, only the guide is different. In this case the guide 28' contains a hollow cylindrical part with a semi-spherical extremity that contains an inner passage 32 that opens out at the front under the level of the liquid 12 that is upstream from the guide through an entry opening 34 and at the back side facing the brush, through an exit opening 36.

When the scraper advances in the direction of the arrow f, a liquid current taken up from the upstream side moves upward along the passage 32 and is ejected through the exit opening 36 over the brush 30. The brush thus receives the liquid it picks up directly from the pipe as well as liquid that arrives through the passage 32.

It goes without saying that instead of a small dish or a brush, we can use any other rotating part that is capable of projected liquid, for example a blade wheel or paddle wheel.

The scraper in FIG. 4 does not contain a battery, an engine or a rotating part. It consists of a cylindrical part 38 whose diameter is more or less equal to the inner diameter of the pipe, except for clearance. Said part 38 is driven longitudinally by the pressure P exerted on the rear side. It has a longitudinal canal 40 that is located above the level of the liquid 12 and therefore lets a gas flow pass through A discharge flow is taken up on this flow using a by-pass 42. The latter opens out on the front side of part 38 through an opening that is located at the lowest point of said part. An axe choke 44 turned toward the arch is attached in said opening.

A ballast weight 46 prevents the cylindrical part 38 from rotating around its axis and holds it in a position in such a way that the choke is located close to the lowest generation of the pipe. The choke is therefore constantly immersed in the liquid 12. The result is that the discharge flow, when exiting the choke, pulverizes the liquid 12 and projects it toward the arch 18.

The principle of the gas discharge can also be used to make the rotating part, such as a brush, a small dish or a paddle or blade wheel, rotate. The discharge flow will be adjusted so that the corrosion inhibiting liquid is projected over the entire surface of the arch.

FIGS. 5 and 6 represent two methods of execution that are part of another family of scrapers wherein the reserve of corrosion inhibiting liquid is carried in the scraper.

In the method of execution used in FIG. 5, the scraper contains from back to front a reservoir 48 filled with corrosion inhibiting liquid 50, a rotating part, such as a hollow cylindrical brush 30 and a guide 28. In this case, the guide is hollow and houses the battery 24 and the engine 26. The latter drives the brush in rotation.

The set moves in the pipe under the effect of the pressure P from the gas exerted on the back wall 52 of the reservoir.

A piston 54 is mounted in the reservoir and is initially located as an abutment against said back wall so as to free up the largest volume possible for the liquid 50. The piston 54 can be moved to the right in FIG. 5 under the effect of the pressure from the gas that is exerted through an opening 56 made in the back wall 52.

As the piston moves, it expulses some liquid 50 through an axial pipe 58 toward the inside of the brush. The latter has many little holes 60 on its cylindrical wall through which the liquid 50 that is in the brush can escape under the effect of the centrifugal force. This ejected liquid is now opposite the brush and is immediately spread by the brush over the arch.

In the method of execution represented in FIGS. 6 and 7, the scraper consists of a cylindrical reservoir 48 equipped, as in the previous method of execution, with a piston 54 that is activated by the pressure P that prevails at the back of the reservoir.

The reservoir is comprised of two concentric cylindrical envelopes 62, 64 with a tubular chamber 66 between them. The inner envelope 64 contains a reserve of corrosion inhibiting liquid 50. The lower part of the tubular chamber contains a ballast weight 46 used to prevent the reservoir from turning on its axis.

The front wall of the inner envelope is pierced with a plurality of holes 68 through which the inside of the reservoir communicates with the upper part of the tubular chamber 66.

The outer envelope 64 is equipped on its upper part and over its entire length with a fixed brush 30. Tightness between the reservoir and the pipe 10 is guaranteed by a joint 27.

The operation of the scraper in FIGS. 6 and 7 is as follows: the scraper is pushed in the pipe by the pressure P from the gas. This pressure is also exerted through the opening 56 on the piston 54 and drives the latter to the right in FIG. 6. The liquid 50 is then expulsed through the holes 68 to the upper part of the tubular chamber 66 from where it is injected into the brush through the holes 60 pierced in the upper part of the outer envelope 62.

The methods of execution that have been described are only some examples among the many possibilities that the man of the art could imagine. They were provided to help understand the principle of the invention that consists in using a single scraper equipped with means for projecting the corrosion inhibiting liquid onto the arch of a pipe.

What is claimed is:

1. Autonomous scraper for the anti-corrosion treatment of a pipe (10) wherein flows, in a stratified, wavy or wavy-stratified regime and under pressure (P), a corrosive multiphase liquid that contains a liquid phase (12) that flows off at the lower part of the pipe and to which is added a corrosion inhibiting liquid at the beginning of the pipe, and a gaseous phase (14) that is located at the upper part of the pipe or arch (18), wherein said scraper comprises:

a cylindrical casing (20) mounted with clearance inside the pipe and equipped on its periphery with watertight means (27) that separate, within the pipe, an upstream side where said pressure (P) prevails from a downstream side, so that the casing is axially driven along the pipe under the effect of the pressure (P), means of uptake and projection (22, 30) carried by the casing located downstream from the latter, and autonomous engine means (24, 26) used to activate said uptake and projection means so that they take up the liquid in said liquid phase as the casing moves in the pipe and project it onto the arch.

2. Scraper as set forth in claim 1, characterized by the fact that said engine means are comprised of a revolving engine

(26) fed by autonomous feeding means, where both are housed inside the casing.

3. Scraper as set forth in claim 2, wherein said autonomous feeding means is a battery (24).

4. Autonomous scraper for the anti-corrosion treatment of a pipe (10) wherein flows, in a stratified, wavy or wavy-stratified regime and under pressure (P), a corrosive multiphase liquid that contains a liquid phase (12) that flows off at the lower part of the pipe and to which is added a corrosion inhibiting liquid at the beginning of the pipe, and a gaseous phase (14) that is located at the upper part of the pipe or arch (18), wherein said scraper comprises:

a cylindrical casing (20) mounted with clearance inside the pipe and equipped on its periphery with watertight means (27) that separate, within the pipe, an upstream side where said pressure (P) prevails from a downstream side, so that the casing is axially driven along the pipe under the effect of the pressure (P);

means of uptake and projection (22, 30) carried by the casing located downstream from the latter; and autonomous engine means (24, 26) used to activate said uptake and projection means so that they take up the liquid in said liquid phase as the casing moves in the pipe and project it onto the arch;

characterized by the fact that said means of uptake and projection are comprised of a revolving part (22, 30) driven in rotation by the engine means, where a portion of said revolving part is immersed in the liquid phase (12) and a non-immersed portion is close to the arch.

5. Scraper as set forth in claim 4, characterized by the fact that said revolving part is comprised of a small dish (22), a brush (30), or a blade or paddle wheel.

6. Autonomous scraper for the anti-corrosion treatment of a pipe (10) wherein flows, in a stratified, wavy or wavy-stratified regime and under pressure (P), a corrosive multiphase liquid that contains a liquid phase (12) that flows off at the lower part of the pipe and to which is added a corrosion inhibiting liquid at the beginning of the pipe, and a gaseous phase (14) that is located at the upper part of the pipe or arch (18), wherein said scraper comprises:

a cylindrical casing (20) mounted with clearance inside the pipe and equipped on its periphery with watertight means (27) that separate, within the pipe, an upstream side where said pressure (P) prevails from a downstream side, so that the casing is axially driven along the pipe under the effect of the pressure (P);

means of uptake and projection (22, 30) carried by the casing located downstream from the latter; and autonomous engine means (24, 26) used to activate said uptake and projection means so that they take up the liquid in said liquid phase as the casing moves in the pipe and project it onto the arch;

further comprising a guide (28, 28') carried by the casing downstream from said means of uptake and projection (22, 30), where the diameter of said guide is slightly smaller than the inner diameter of the pipe so as to push back the liquid that is downstream from said means of uptake and projection.

7. Scraper as set forth in claim 6, characterized by the fact that the guide (28') contains an inner passage (32) with an entry opening (34) located at the front of the guide under the level of the liquid phase (12) and an exit opening (36) located at the back of the guide above the level of the liquid phase and facing said means of uptake and projection, so that as the casing moves in the pipe, liquid from the liquid phase moves upward along said passage and is injected through the exit opening over said means of uptake and projection.

8. Autonomous scraper for the anti-corrosion treatment of a pipe (10) wherein flows, in a stratified, wavy or wavy-stratified regime and under pressure (P), a corrosive multiphase liquid that contains a liquid phase (12) that flows off at the lower part of the pipe and to which is added a corrosion inhibiting liquid at the beginning of the pipe, and a gaseous phase (14) that is located at the upper part of the pipe or arch (18), wherein said scraper comprises:

a cylindrical part (38) mounted with clearance inside the pipe, so that the cylindrical part is axially driven along the pipe under the effect of the pressure (P);

a canal (40) with an entry opening that opens out in the gaseous phase (14) located upstream from the cylindrical part and lets a gas flow pass through;

a by-pass (42) that enables a discharge flow to be taken from the gas flow passing through canal (40), wherein the bypass (42) has an exit opening that opens out in the liquid phase located downstream from the cylindrical part;

means of projection (44) provided at a downstream side of the cylindrical part, wherein said means of projection are comprised of a nozzle (44) attached in said exit opening that enables the emission of the gas discharge into the liquid phase located downstream from the cylindrical part, where said nozzle is turned in such a way that the gas ejected into the liquid phase projects some of this liquid onto the arch (18);

and a ballast weight (46) attached to the cylindrical part so as to hold it in an angular position in which the nozzle is constantly immersed in the liquid phase.

9. Autonomous scraper for the anti-corrosion treatment of a pipe (10) wherein flows, in a stratified, wavy or wavy-stratified regime and under pressure (P), a corrosive multiphase liquid that contains a liquid phase (12) that flows off at the lower part of the pipe and to which is added a corrosion inhibiting liquid at the beginning of the pipe, and a gaseous phase (14) that is located at the upper part of the pipe or arch (18), wherein said scraper comprises:

a hollow cylindrical reservoir (48) mounted with clearance inside the pipe and equipped on its periphery with watertight means (27) that separate, within the pipe, an upstream side where said pressure (P) prevails from a downstream side, so that the reservoir is axially driven along the pipe under the effect of the pressure (P); and means of projection (30) carried by the reservoir located downstream from the latter;

characterized by the fact that said hollow cylindrical reservoir (48) has a back wall (52) in which is pierced an entry opening (56) that opens out in the gaseous phase (14) located upstream from the reservoir and a front wall with an exit opening (58), where a piston (54) is mounted in the reservoir in an initial position where it is applied against the back wall so as to free up as much volume as possible in the reservoir, where this volume is filled with a reserve of corrosion inhibiting liquid (50), where said piston moves inside the reservoir toward the front wall under the effect of the pressure from the gaseous phase that is exerted on it through the entry opening and thus progressively expulses the corrosion inhibiting liquid through the exit opening toward said means of projection, wherein said scraper further comprises autonomous engine means (24, 26) used to activate said projection means so that they project said corrosion inhibiting liquid onto the arch.

10. Scraper as set forth in claim 9, characterized by the fact that the means of projection are comprised of a cylindrical and hollow rotary part that communicates with the reservoir (48) through said exit opening (58), where said cylindrical part has a plurality of holes (60) on its peripheral wall for the ejection of the corrosion inhibiting liquid (50) it has received, where said rotary part is driven in rotation by an said autonomous engine means (26) housed inside a hollow guide (28) attached to the front of the reservoir.

11. Autonomous scraper for the anti-corrosion treatment of a pipe (10) wherein flows, in a stratified, wavy or wavy-stratified regime and under pressure (P), a corrosive multiphase liquid that contains a liquid phase (12) that flows off at the lower part of the pipe and to which is added a corrosion inhibiting liquid at the beginning of the pipe, and a gaseous phase (14) that is located at the upper part of the pipe or arch (18), wherein said scraper comprises:

a hollow cylindrical reservoir (48) mounted with clearance inside the pipe and equipped on its periphery with watertight means (27) that separate, within the pipe, an upstream side where said pressure (P) prevails from a downstream side, so that the reservoir is axially driven along the pine under the effect of the pressure (P);

characterized by the fact that the reservoir contains two concentric cylindrical envelopes (62, 64) with a common back wall in which is pierced an entry opening (56) located at the level of the gaseous phase (14) and two respective front walls where an exit opening (68) is pierced in that of the inner envelope, the annular space between the two envelopes is partially filled with a ballast weight (46) so that the reservoir maintains an invariable angular position in the pipe, and the outside envelope is equipped along its entire upper section with a brush (30) that is in contact with the arch and has a plurality of exit openings (60) pierced directly opposite the brush, where the inner envelope contains a piston (54) initially applied against the common back wall so as to free up the maximum space possible in said envelope and fill it with a reserve of corrosion inhibiting liquid.

* * * * *